United States Patent
Chu et al.

(10) Patent No.: US 8,917,028 B2
(45) Date of Patent: *Dec. 23, 2014

(54) DRIVING CIRCUIT

(71) Applicant: Raydium Semiconductor Corporation, Hsinchu (TW)

(72) Inventors: Chih-Wei Chu, New Taipei (TW); Shu-Kuang Chou, New Taipei (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/934,461

(22) Filed: Jul. 3, 2013

(65) Prior Publication Data

US 2014/0125228 A1    May 8, 2014

(30) Foreign Application Priority Data

Nov. 8, 2012    (TW) .............................. 101141610 A

(51) Int. Cl.
*H05B 37/02*    (2006.01)
*H05B 33/08*    (2006.01)

(52) U.S. Cl.
CPC .......... *H05B 33/083* (2013.01); *H05B 33/0815* (2013.01); *Y02B 20/346* (2013.01)
USPC .... 315/209 R; 315/291; 315/193; 315/185 R; 315/186; 315/122

(58) Field of Classification Search
CPC ... H05B 33/0869; H05B 33/0803; H05B 4/46
USPC .............. 315/152, 193, 186, 122, 185 R, 291
See application file for complete search history.

(56) References Cited

U.S. PATENT DOCUMENTS

| | | | |
|---|---|---|---|
| 2005/0276294 A1* | 12/2005 | Crawford et al. .......... | 372/38.02 |
| 2010/0134018 A1* | 6/2010 | Tziony et al. ................. | 315/122 |
| 2010/0164403 A1* | 7/2010 | Liu ................ | 315/297 |
| 2011/0110673 A1* | 5/2011 | Elberbaum ................... | 398/202 |
| 2012/0081009 A1* | 4/2012 | Shteynberg et al. ......... | 315/122 |
| 2012/0200229 A1* | 8/2012 | Kunst et al. ................... | 315/186 |
| 2013/0002141 A1* | 1/2013 | Lee ............................... | 315/152 |

* cited by examiner

*Primary Examiner* — Thuy Vinh Tran
*Assistant Examiner* — Syed M Kaiser

(57) ABSTRACT

A driving circuit includes a plurality of light-emitting units, a plurality of switches, and a voltage generating module. The light-emitting units are coupled with each other in series and are driven with an input voltage varying according to a frequency. Each switch has a preset voltage and an activation voltage and includes a light-emitting end, a control end, and a setting end. The light-emitting ends are coupled with the light-emitting units, and the setting ends of the switches are coupled with each other. The voltage generating module includes a plurality of control units and provides a plurality of control voltages to the switches, and each switch is driven to be activated or to be deactivated according to a relation of the preset voltage and a difference between the control voltage and the activation voltage when the input voltage drives the light-emitting units, the switches, and the control units.

8 Claims, 9 Drawing Sheets

US 8,917,028 B2

DRIVING CIRCUIT

BACKGROUND OF THE INVENTION

1. Field of the Invention

The present invention relates generally to a driving circuit; particularly, the present invention relates to a light-emitting diode (LED) driving circuit capable of decreasing the cost and improving efficiency.

2. Description of the Related Art

For enhancing power conversion efficiency of driving circuit, the conventional LED driving circuit utilizes a switching power converter to improve power conversion efficiency. For instance, as shown in FIG. 1, a rectifier 2 converts AC (alternating current) power into full-wave rectification voltages and transmits the full-wave rectification voltages to a transformer 3. It is noted that an output end of the rectifier 2 is coupled with an active switch SW1 and a storing capacitor C1, and the other end of the transformer 3 is coupled with a diode 5 and an output capacitor C2.

In addition, a controller 4 controls a driven state of the active switch SW1 and connects the output capacitor C2 through a feedback module 6. In practical applications, the feedback module 6 is connected to the output voltage Vout and can retrieve a feedback signal (voltages, currents, or duty) of the output voltage Vout. It is noted that the controller 4 controls a pulse width of a control signal of the active switch SW1 according to a difference between the feedback signal of the output voltage Vout and a reference voltage Vref so that the output voltage Vout and current is maintained at a constant. In other words, the driving circuit of FIG. 1 utilizes the controller 4 instead of a resistive regulator to maintain stability of the output voltage so as to increase power conversion efficiency.

However, the driving circuit includes high-frequency electronic components, such as the storing capacitor C1 and the output capacitor C2. In other words, when AC power is transmitted into the storing capacitor C1 and the output capacitor C2, the driving circuit generates visual work, so that the driving circuit cannot achieve the high power factor. As shown in FIG. 1, R&D (research and development) people try to utilize a power-factor-adjusting module 7 to improve the low power factor phenomena. However, the power-factor-adjusting module 7 results in a larger size driving circuit and additional material cost and is hard to be used in small sized illuminating products.

In addition, another conventional LED driving circuit utilizes AC/DC power converter to generate the output voltage, and the output voltages drive the LEDs to generate light. In practical applications, the LED driving circuit includes a power supply module, wherein the power supply module controls current of the circuit, so that the current amplitude crossing over the LEDs remains constant, and the brightness of the LEDs maintains constant.

Particularly, the conventional LED driving circuit further includes a plurality of switches and a plurality of comparators corresponding to the switches, wherein the switches are respectively coupled with corresponding comparators and LEDs. In addition, each comparator has a constant voltage and determines whether to transmit activating control signal to the switches according to the relation between the constant voltage and the input voltage. In practical applications, the conventional LED driving circuit controls the light-emitting result of driving the LEDs according to the activating condition of the switches. In other words, if more switches are driven to be activated, more LEDs generate light. However, in the circuit, because each switch corresponds to one comparator, the circuit requires lots of comparators, resulting in a complicated driving circuit and the increase in production cost.

For the above reasons, it is an object how to design an LED driving circuit for enhancing efficiency and decreasing the cost.

SUMMARY OF THE INVENTION

In view of prior arts, the present invention provides a driving circuit which has high power factor, low harmonic distortion, high light-emitting efficiency, and a simplified structure.

It is an object of the present invention to provide a driving circuit having a modified switch configuration to decrease the cost.

It is an object of the present invention to provide a driving circuit utilizing a voltage generating module to enhance power factor.

It is an object of the present invention to provide a driving circuit for controlling a current driving path to decrease current peaks of light-emitting units so as to extend the service life of the light-emitting units.

It is an object of the present invention to provide a driving circuit, which is coupled with a heat sink module, offering the heat dissipation function and avoiding voltages overly higher than the crossing voltages of the light-emitting units to prevent overheating of the circuit.

In one embodiment, the present invention provides a driving circuit including a plurality of light-emitting units, a plurality of switches, and a voltage generating module. The light-emitting units are coupled with each other in series and are driven with an input voltage varying according to a frequency. In addition, each switch has a preset voltage and an activation voltage and includes a light-emitting end, a control end, and a setting end. The light-emitting ends are coupled with the light-emitting units, and the setting ends of the switches are coupled with each other.

It is noted that the voltage generating module includes a plurality of control units and provides a plurality of control voltages to the switches, and each switch is driven to be activated or to be deactivated according to a relation of the preset voltage and a difference between the control voltage and the activation voltage when the input voltage drives the light-emitting units, the switches, and the control units. In practical applications, the light-emitting units generate light according to the output voltage and the driven state of the switches.

In comparison with prior arts, the driving circuit of the present invention utilizes the voltage generating module to adjust the voltages and to provide the control voltages to the switches so as to control the switches to be activated or to be deactivated. In practical applications, the driving circuit utilizes the voltage generating module to control the operating bias voltage to determine the driven state of the light-emitting units. In addition, no matter how many light-emitting units are driven to be activated, the driving circuit does not need to drive all of the switches to be activated at the same time so as to drive all of the light-emitting units to generate light. In an embodiment, the voltage utilized by the light-emitting units and the input voltage are full-wave rectification voltages, so that only small amount of input voltage is wasted, further enhancing the power factor and decreasing harmonic distortion. In addition, the driving circuit of the present invention only utilizes the switches and the voltage generating module to control the light-emitting units, thus enhancing light-emitting efficiency of the light-emitting units and decreasing the cost. Furthermore, the driving circuit of the present invention controls the light-emitting units to be activated respectively in an AC current period by a sectional driven mode so as to effectively utilize the light-emitting units to achieve high light-emitting efficiency.

The detailed descriptions and the drawings thereof below provide further understanding about the advantage and the spirit of the present invention.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

According to an embodiment of the present invention, a driving circuit is provided. In the embodiment, the driving circuit can be an LED driving circuit. Particularly, the driving circuit changes the connecting relation between the LEDs and other components to simplify the circuit structure.

Figure 1:
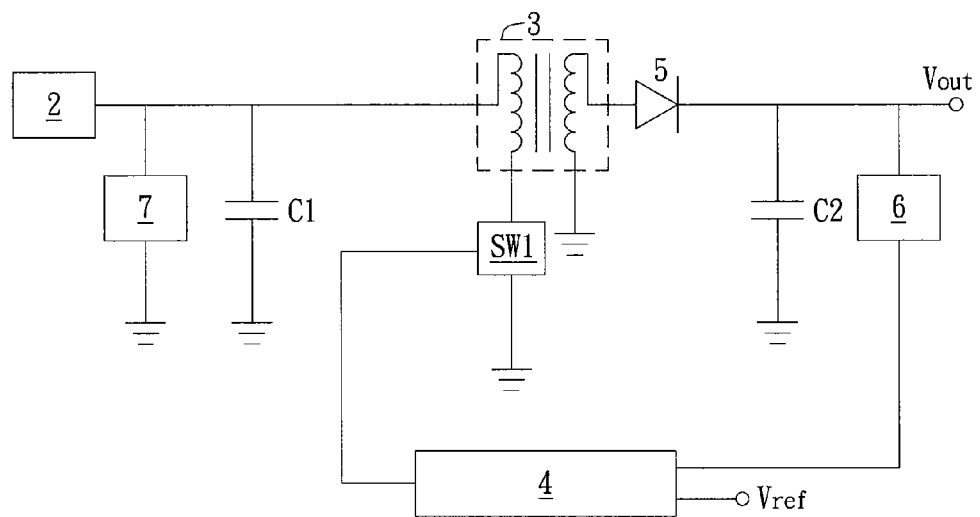
FIG. 1 is a schematic view of the conventional LED driving circuit.
Figure 2:
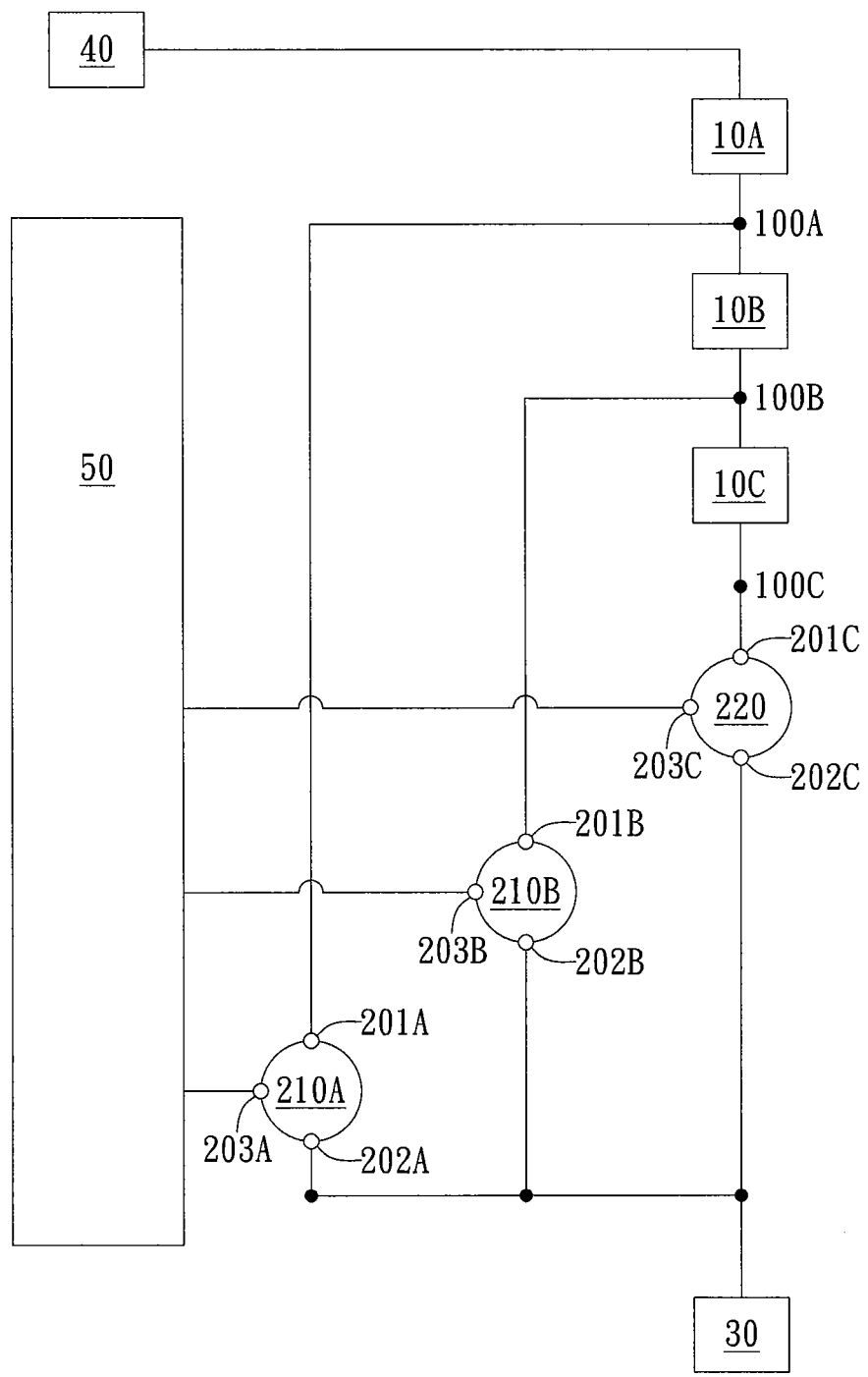
FIG. 2 is a schematic view of an embodiment of the driving circuit of the present invention.

Please refer to FIG. 2; FIG. 2 is a schematic view of an embodiment of a driving circuit 1 of the present invention. As shown in FIG. 2, the driving circuit 1 includes a plurality of light-emitting units 10A/10B/10C, a plurality of switches 210A/210B/220, a current setting module 30, a power supply rectifier 40, a voltage generating module 50, wherein the switches include operating switches 210A/210B and a terminal switch 220. In addition, the light-emitting units 10A~10C are coupled between the power supply rectifier 40 and the current setting module 30. The operating switches 210A/210B and the terminal switch 220 are coupled between the light-emitting units 10A~10C and the voltage generating module 50. The operating switches 210A/210B and the terminal switch 220 are also coupled with the current setting module 30.

In practical applications, the power supply rectifier 40 is coupled with the light-emitting units 10A~10C and provides an input voltage. Practically, the power supply rectifier 40 has an alternating current (AC) power and a rectifier module, wherein the rectifier module converts voltage of the AC power into direct current (DC) voltage. For instance, the power supply rectifier 40 can be a half-wave power supply rectifier or a full-wave power supply rectifier, wherein the full-wave power supply rectifier includes a bridge full-wave power supply rectifier, a center-tapped power supply rectifier, a vacuum tube power supply rectifier, a three-phase power supply rectifier, etc., but not limited to the embodiment. In the embodiment, the power supply rectifier 40 converts AC voltage into a rectified input voltage, wherein the input voltage is a full-wave rectification voltage.

In the embodiment, the light-emitting units 10A~10C are coupled with each other in series, and the power supply rectifier 40 drives the light-emitting units 10A~10C with the input voltage, wherein the input voltage varies according to a frequency. It is noted that in other embodiments, the driving circuit 1 can be disposed with different amounts of light-emitting units according to practical requirements, not limited to the embodiment. In addition, the light-emitting unit of the present invention can be LED, laser light-emitting unit, fluorescence device, or the combinations thereof. In the embodiment, the light-emitting unit is the LED, wherein colors of the LED include white, red, green, and/or blue.

It is noted that, when the light-emitting units 10A~10C are driven with the input voltage which varies according to the frequency and is a full-wave rectification voltage, a voltage crossing over the light-emitting units is a full-wave rectification voltage. In addition, the frequency can be 60 Hz, 120 Hz, 50 Hz, or 100 Hz, but is not limited to the embodiment. In the embodiment, the frequency is preferably 120 Hz.

It is noted that each switch has a preset voltage and an activation voltage and includes a light-emitting end 201A/201B/201C, a setting end 202A/202B/202C, and a control end 203A/203B/203C. In addition, the light-emitting ends 201A/201B/201C are coupled with the light-emitting units 10A~10C, and the setting ends 202A/202B/202C of the switches are coupled with each other. For instance, the light-emitting end 201A of the operating switch 210A is coupled with the coupling node 100A of the light-emitting units 10A/10B; and the light-emitting end 201B of the operating switch 210B is coupled with the coupling node 100B of the light-emitting units 10B/10C. In addition, the light-emitting end 201C of the terminal switch 220 is coupled with the terminal end 100C of the light-emitting units 10A~10C, and the control voltage of the terminal switch 220 is larger than or equal to the control voltage of the operating switches 210A/210B.

In practical applications, the switches can be transistors or other electrode switch components. In the embodiment, the switches are transistors, wherein the light-emitting ends are source ends; the setting ends are drain ends; the control ends are gate ends, but not limited to the embodiment. It is noted that the preset voltages of the switches are gate voltages, and the activation voltages are threshold voltages.

As shown in FIG. 2, the voltage generating module 50 is coupled with the control ends 203A/203B/203C of the switches 210A/210B/220. The voltage generating module 50 provides the control voltages to the switches 210A/210B/220 and each switch is driven to be activated or to be deactivated according to a relation of the preset voltage and a difference between the control voltage and the activation voltage when the power supply rectifier 40 provides the input voltage to drive the light-emitting units 10A~10C, the switches 210A/210B/220, and the voltage generating module 50. In the embodiment, a corresponding switch is driven to be activated when the control voltage thereof is larger than the preset voltage and the difference between the control voltage and the activation voltage is larger than or equal to the preset voltage.

Figure 3:
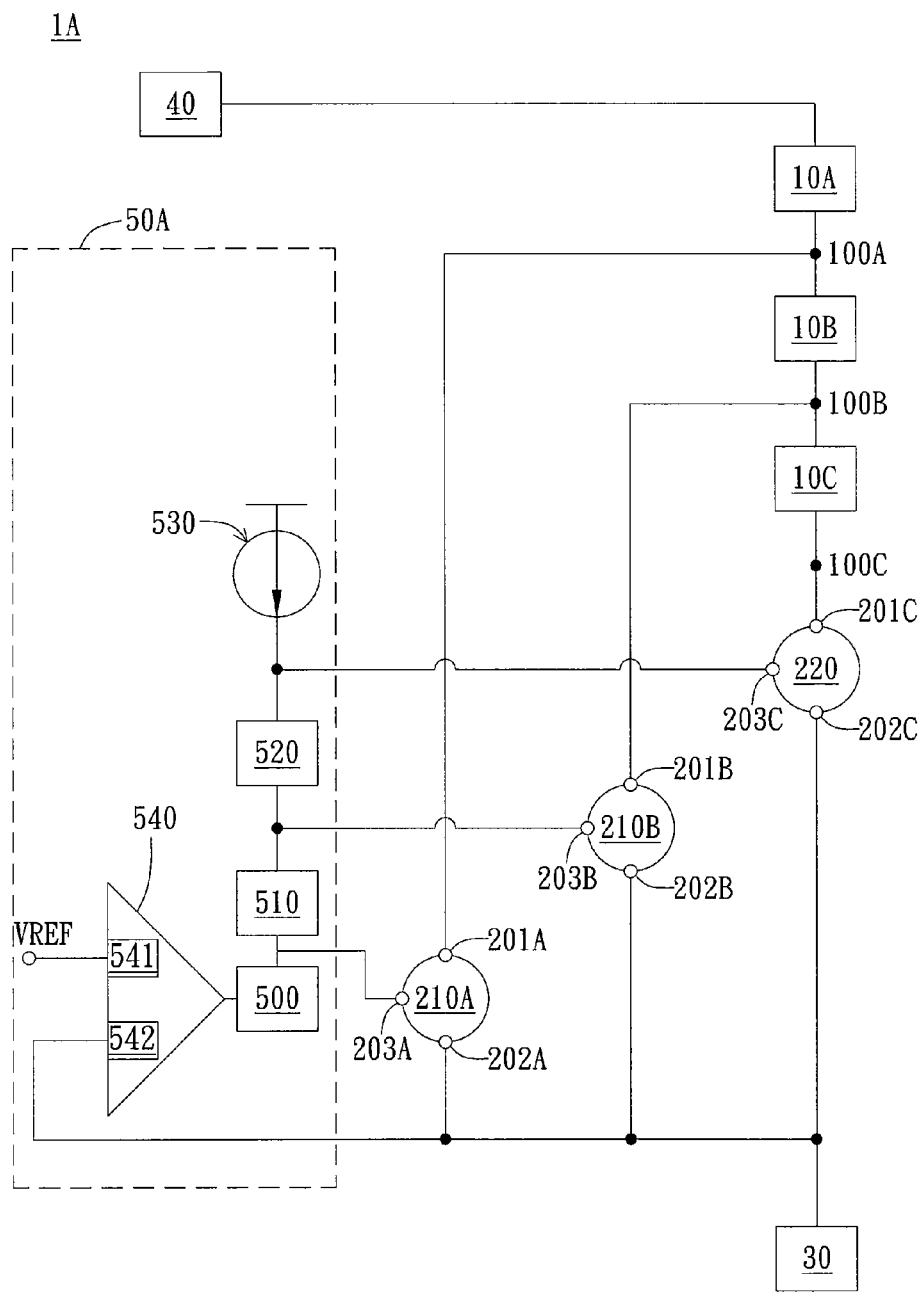
FIG. 3 is a schematic view of another embodiment of the driving circuit of the present invention.

In addition, the present invention provides the embodiment of FIG. 3 to explain the detailed operations of the driving circuit.

Please refer to FIG. 3; FIG. 3 is a schematic view of an embodiment of a driving circuit 1A of the present invention. As shown in FIG. 3, the voltage generating module 50A of the driving circuit 1A includes an adjusting switch 500, a plurality of control units 510/520, a power supply 530, and an adjusting unit 540, wherein the adjusting switch 500 is coupled between an output end of the adjusting unit 540, the control unit 510, and a control end 203A. Each control unit 510/520 is respectively coupled between the adjacent control ends. The power supply 530 is coupled with the control units and provides voltages. The adjusting unit 540 is coupled with the adjusting switch 500.

For instance, the control unit 510 is coupled between the control end 203A and the control end 203B, and the control unit 520 is coupled between the control end 203B and the control end 203C. It is noted that the control units 510/520 can be resistors, diodes, transistors, or other electronic components, and the adjusting switch 500 can be a transistor or other switch components, wherein the transistor may include bipolar junction transistor (BJT) and metal-oxide-semiconductor field-effect transistor (MOSFET). In addition, the component of the control units can be chosen according to product specifications or practical requirements and is not limited to the embodiment. In the embodiment, the control units are resistors and the adjusting switch is the transistor, but not limited to the embodiment.

In practical applications, when the power supply rectifier 40 transmits the voltages to drive the light-emitting units 10A~10C, the switches 210A/210B/220, and the control units 510/520, the voltage generating module 50A adjusts the voltages of the adjusting switch 500 and provides the control voltages to the switches, and each switch is driven to be activated or to be deactivated according to a relation of the preset voltage and a difference between the control voltage and the activation voltage.

In addition, the current setting module 30 is coupled between the setting ends of the switches and the adjusting units 540 of the voltage generating module 50A. As shown in FIG. 3, the adjusting unit 540 has a positive input end 541 and a negative input end 542, wherein the negative input end 542 is coupled with the current setting module 30.

In practical applications, the adjusting unit 540 of the voltage generating module 50A provides a reference voltage (VREF). The adjusting unit 540 also provides an operating bias voltage to the current setting module 30, wherein the current setting module 30 (which is usually a resistor) determines peak current values of the light-emitting units 10A~10C, and the voltage generating module 50A controls the operating bias voltage to determine the light-emitting voltage of each light-emitting unit 10A~10C and the control voltages of the switches. In addition, the voltage generating module 50A can control the operating bias voltages as square-wave voltages, full-wave rectification voltages, or voltages having clamped upper-limit, but not limited to the embodiment.

In the embodiment, the voltage generating module 50A controls the operating bias voltages as the square-wave voltages, further to determine the light-emitting voltage of the light-emitting units as square-wave voltage. In particular, the voltage generating module 50A and the current setting module 30 form a negative feedback control circuit to control the current crossing the light-emitting units 10A~10C. In other words, the current setting module 30 controls the current crossing the light-emitting units to be stable so as to maintain the brightness of the light-emitting units.

Figure 4:
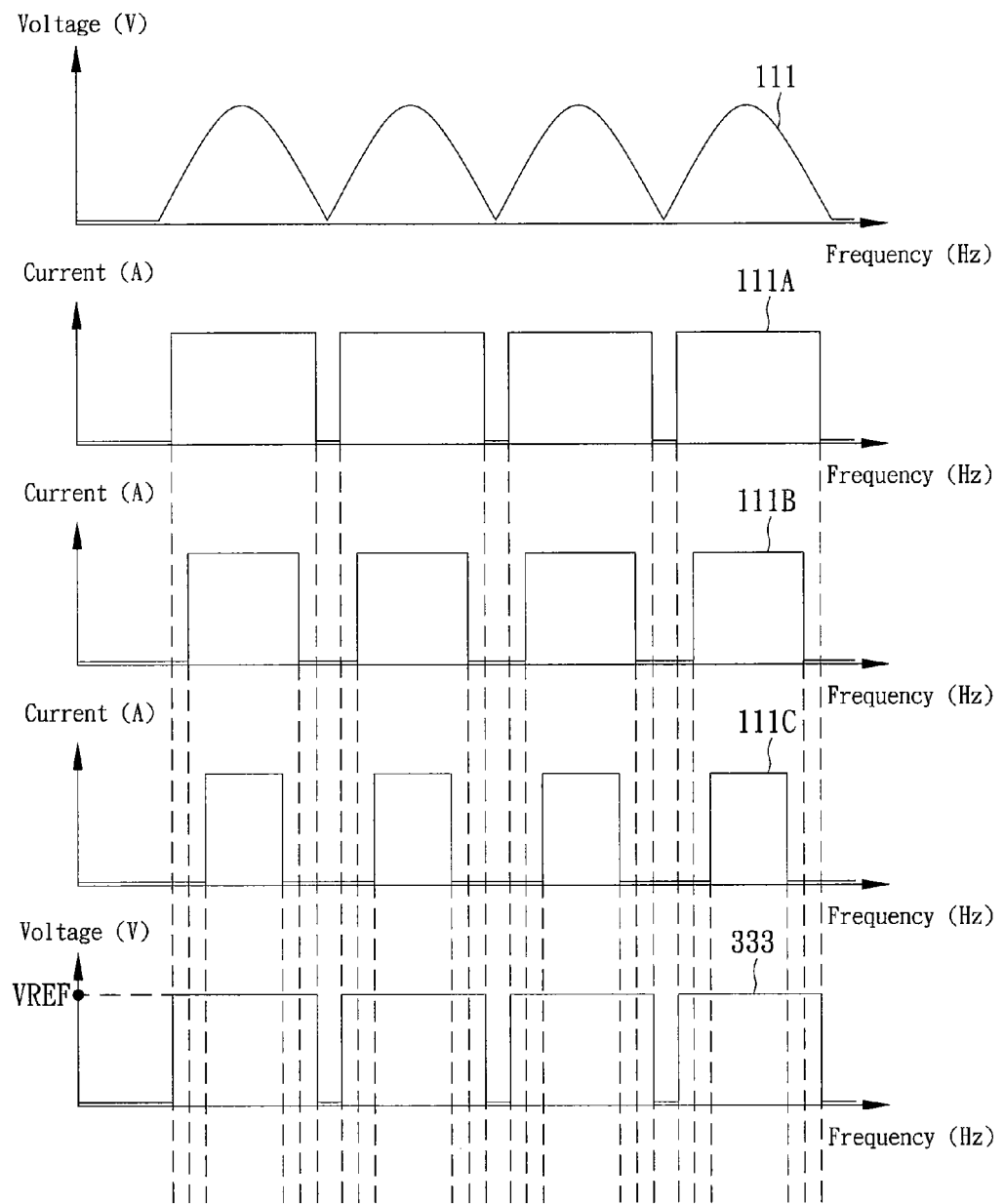
FIG. 4 is a schematic view showing the relation between the current curve of the input voltage, the current curve of the light-emitting unit, and the voltage curve of the current setting module of the present invention.

As shown in FIG. 3, the positive input end 541 of the adjusting unit 540 receives the reference voltage VREF, and the adjusting unit 540 control the operating bias voltage according to the reference voltage VREF, so that the operating bias voltage is less than or equal to the reference voltage VREF. Furthermore, the driving circuit 1A utilizes the virtual short character of the adjusting unit 540 to maintain the operating bias voltage at the reference voltage VREF to form the square-wave voltage. Please refer to FIG. 4; FIG. 4 is a schematic view showing the relation between the current curve of the input voltage, the current curve of the light-emitting unit, and the voltage curve of the current setting module of the present invention.

As shown in FIG. 4, the input voltage curve 111 has full-wave rectification waveform; the voltage curve 333 of the current setting module has square-wave waveform, and the peak of the operating bias voltage is less than or equal to the reference voltage VREF. In addition, the current curve 111A of the light-emitting unit 10A, the current curve 111B of the light-emitting unit 10B, the current curve 111C of the light-emitting unit 10C, and the voltage curve 333 of the current setting module 30 have square-wave waveform. It is noted that the current setting module 30 further has an operating resistor (not shown). When the switches are operated at the saturation region, the current peak value of the light-emitting units is equal to the ratio of the operating bias voltage to the operating resistor, so that the driving circuit 1A can adjust the operating resistor to control the currents crossing the light-emitting units.

As shown in FIG. 3, the power supply rectifier 40 provides the output voltage to drive the light-emitting units 10A~10C, the switches 210A/210B/220, and the control units 510/520. The voltage generating module 50A adjusts the voltages of the adjusting switch 500 and provides a plurality of control voltages to the switches 210A/210B/220. Each switch is driven to be activated or to be deactivated according to the relation of the preset voltage and the difference between the control voltage and the activation voltage. In practical applications, a corresponding switch is driven to be activated when the control voltage thereof is larger than the preset voltage and the difference between the control voltage and the activation voltage is larger than or equal to the preset voltage.

For instance, each light-emitting unit has ten LED devices (not shown), and the voltage for driving one LED device to generate light is 3 V, so that the driving voltage of each light-emitting unit is 30 V, but the driving voltage is not limited to the embodiment. In other words, the driving voltage of the light-emitting unit 10A, the light-emitting unit 10B, and the light-emitting unit 10C is 30 V. In addition, each switch has a VDS (a voltage between the drain and the source), wherein the VDS is 1.5 V and is a critical activation voltage between the light-emitting end and the setting end, but not limited to the embodiment.

For instance, when the input voltage is 32 V and is larger than the sum value of the voltage (30 V) of the light-emitting unit 10A and the VDS (1.5 V) of the operating switch and the voltage generating module 50A provides the control voltage to the switches, the light-emitting unit 10A is driven to generate light and the operating switch 210A is driven to be activated.

It is noted that the preset voltage of each switch is 3 V, and the activation voltage of each switch is 0.7 V, but not limited to the embodiment. When the input voltage is larger than the sum value of the voltage of the light-emitting unit 10A and the VDS of the operating switch, the driving circuit 1A utilizes the voltage generating module 50A to adjust the voltage of the adjust switch 500 to generate the control voltage; the voltage generating module 50A, the operating switch 210A, and the current setting module 30 form a control feedback circuit, so that the light-emitting unit 10A is driven to generate light and the operating switch 210B and the terminal switch 220 are at the turn_ON state. In the embodiment, the control voltage is 3.7 V, and the difference between the control voltage (3.7 V) and the activation voltage (0.7 V) of the operating switch 210A is larger than or equal to the preset voltage (3 V), so the operating switch 210A is at the regulated state.

As shown in FIG. 3, the control unit 510 is coupled between the operating switch 210A and the operating switch 210B, and the voltages crossing the control unit 510 or the control unit 520 are 1 V, so that the control voltage received by the control end 203B of the operating switch 210B is 4.7 V (computed from 3.7 V+1 V). The difference between the control voltage (4.7 V) and the activation voltage (0.7 V) is larger than or equal to the preset voltage (3 V), so that the operating switch 210B is operated at the turn_ON state. In addition, the control voltage received by the control end 203C of the terminal switch 220 is 5.7 V (computed from 4.7 V+1 V). The difference between the control voltage (5.7V) and the activation voltage (0.7 V) is larger than or equal to the preset voltage (3 V), so that the terminal switch 220 is at the turn_ON state.

It is noted that after the input voltage (32 V) passes through the light-emitting unit 10A and the operating switch 210A, the remaining of the input voltage is 0.5 V (computed from 32 V−30 V−1.5 V) and is not enough to drive the light-emitting unit 10B to generate light, so that the current does not pass through the light-emitting unit 10C and the terminal switch 220.

In addition, the input voltage continues increasing from 32V. For instance, when the input voltage is 62V that is larger than the voltage (60 V) of the light-emitting unit 10A and the light-emitting unit 10B, and the voltage generating module 50A adjusts the voltage of the adjusting switch 500 and provides the control voltage to the switches, the light-emitting unit 10A and the light-emitting unit 10B are driven to generate light, the operating switch 210B is driven to be activated, and the light-emitting unit 10A, the light-emitting unit 10B, and the operating switch 210B form a control feedback circuit. Furthermore, when the input voltage is larger than the sum value of the voltage of the light-emitting unit 10A and the light-emitting unit 10B and the VDS of the operating switch 210B, the driving circuit 1A utilizes the voltage generating module 50A to generate the control voltage, so that the light-emitting unit 10A and the light-emitting unit 10B are driven to generate light and the operating switch 210B and the terminal switch 220 are respectively at the regulated state and at the turn_ON state.

It is noted that the current passes through the light-emitting unit 10A, the light-emitting unit 10B, and the operating switch 210B, and the voltage generating module 50A controls the operating bias voltage to be maintained at the reference voltage VREF, so that the control voltage received by the operating switch 210A, the operating switch 210B, and the terminal switch 220 are respectively 2.7 V, 3.7 V, and 4.7 V. It is noted that the control voltage received by the operating switch 210A is 2.7 V and the difference between the control voltage (2.7 V) and the activation voltage (0.7 V) is less than the preset voltage (3 V), so that the operating switch 210A is operated at the turn_OFF state. In practical applications, the input voltage (62 V) passes through the light-emitting unit 10A, the light-emitting unit 10B, and the operating switch 210B, the remaining of the input voltage is 0.5V (computed from 62 V−60 V−1.5 V) that is not enough to drive the light-emitting unit 100 to generate light, so that the current does not pass through the light-emitting unit 10C and the terminal switch 220.

In addition, the input voltage continues increasing from 62V. For instance, when the input voltage is 92V that is larger than the voltage (90 V) of the light-emitting unit 10A, the light-emitting unit 10B, and the light-emitting unit 10C, and the voltage generating module 50A adjusts the voltage of the adjusting switch 500 and provides the control voltage to the switches, the light-emitting unit 10A, the light-emitting unit 10B, and the light-emitting unit 10C are driven to generate light and the terminal switch 220 is driven to be activated. Furthermore, when the input voltage is larger than the sum value of the voltage of the light-emitting unit 10A, the light-emitting unit 10B, and the light-emitting unit 10C and the VDS of the terminal switch 220, the driving circuit 1A utilizes the voltage generating module 50A to generate the control voltage, so that the light-emitting unit 10A, the light-emitting unit 10B, and the light-emitting unit 10C are driven to generate light, the terminal switch 220 is driven at the regulated state, and the light-emitting unit 10A, the light-emitting unit 10B, the light-emitting unit 10C, and the terminal switch 220 form a control feedback circuit.

It is noted that the current passes through the light-emitting unit 10A, the light-emitting unit 10B, the light-emitting unit 10C, and the terminal switch 220, and the voltage generating module 50A controls the operating bias voltage to be maintained at the reference voltage VREF, so that the control voltage received by the operating switch 210A, the operating switch 210B, and the terminal switch 220 are respectively 1.7 V, 2.7 V, and 3.7 V. It is noted that the control voltage received by the operating switch 210A is 1.7 V and the difference between the control voltage (1.7 V) and the activation voltage (0.7 V) is less than the preset voltage (3 V), so that the operating switch 210A is operated at the turn_OFF state. In addition, the control voltage received by the operating switch 210B is 2.7 V, and the difference between the control voltage (2.7 V) and the activation voltage (0.7 V) is less than the preset voltage (3 V), so that the operating switch 210B is operated at the turn_OFF state.

It is noted that the input voltage curve 111 begins decreasing from the peak. For instance, when the input voltage is 92 V that is larger than the voltage (90 V) of the light-emitting unit 10A, the light-emitting unit 10B, and the light-emitting unit 10C, and the voltage generating module 50A adjusts the voltage of the adjusting switch 500 and provides the control voltage to the switches, the light-emitting unit 10A, the light-emitting unit 10B, and the light-emitting unit 10C are driven to generate light and the terminal switch 220 is driven to be activated. Furthermore, when the input voltage is larger than the sum value of the voltage of the light-emitting unit 10A, the light-emitting unit 10B, and the light-emitting unit 10C and the VDS of the terminal switch 220, the driving circuit 1A utilizes the voltage generating module 50A to generate the control voltage, so that the light-emitting unit 10A, the light-emitting unit 10B, and the light-emitting unit 10C are driven to generate light, the terminal switch 220 is driven at the regulated state, and the light-emitting unit 10A, the light-emitting unit 10B, the light-emitting unit 10C, and the terminal switch 220 form a control feedback circuit.

In addition, the current passes through the light-emitting unit 10A, the light-emitting unit 10B, the light-emitting unit 10C, and the terminal switch 220, and the voltage 50A controls the operating bias voltage to be maintained at the reference voltage VREF, so that the control voltage received by the operating switch 210A, the operating switch 210B, and the terminal switch 220 are respectively 1.7 V, 2.7 V, and 3.7 V. It is noted that the control voltage received by the operating switch 210A is 1.7 V and the difference between the control voltage (1.7 V) and the activation voltage (0.7 V) is less than the preset voltage (3 V), so that the operating switch 210A is operated at the turn_OFF state. In other words, the control voltage received by the operating switch 210B is 2.7 V, and the difference between the control voltage (2.7 V) and the activation voltage (0.7 V) is less than the preset voltage (3 V), so that the operating switch 210B is operated at the turn_OFF state.

As shown in FIG. 4, the input voltage continues decreasing from 92V. For instance, when the input voltage is 62 V that is larger than the voltage (60 V) of the light-emitting unit 10A and the light-emitting unit 10B, and the voltage generating module 50A adjusts the voltage of the adjusting switch 500 and provides the control voltage to the switches, so that the light-emitting unit 10A, the light-emitting unit 10B, and the operating switch 210B are driven to be activated. Furthermore, when the input voltage is larger than the sum value of the VDS of the terminal switch 220 and the voltage of the light-emitting unit 10A and the light-emitting unit 10B, the driving circuit 1A utilizes the voltage generating module 50A to generate the control voltage, so that the light-emitting unit 10A and the light-emitting unit 10B are driven to generate light, the operating switch 210B and the terminal switch 220 are respectively driven at the regulated state and at the turn_ON state, and the light-emitting unit 10A, the light-emitting unit 10B, and the terminal switch 220 form a control feedback circuit.

It is noted that the current passes through the light-emitting unit 10A, the light-emitting unit 10B, and the operating switch 210B, and the voltage generating module 50A controls the operating bias voltage to be maintained at the reference voltage VREF, so that the control voltage received by the operating switch 210A, the operating switch 210B, and the terminal switch 220 are respectively 2.7 V, 3.7 V, and 4.7 V. It is noted that the control voltage received by the operating switch 210A is 2.7 V and the difference between the control voltage (2.7 V) and the activation voltage (0.7 V) is less than the preset voltage (3 V), so that the operating switch 210A is operated at the turn_OFF state. In practical applications, the input voltage (62 V) passes through the light-emitting unit 10A, the light-emitting unit 10B, and the operating switch 210B, the remaining of the input voltage is 0.5V (computed from 62 V−60 V−1.5 V) and is not enough to drive the light-emitting unit 100 to generate light, so that the current does not pass through the light-emitting unit 10C and the terminal switch 220.

In addition, the input voltage continues decreasing from 62V. For instance, when the input voltage is 32 V that is larger than the sum value of the voltage (30 V) of the light-emitting unit 10A and the VDS (1.5 V) of the operating switch 210A, and the voltage generating module 50A adjusts the voltage of the adjusting switch 500 and provides the control voltage to the switches, so that the light-emitting unit 10A and the operating switch 210A are driven to be activated. It is noted that, when the input voltage is larger than the sum value of the VDS of the operating switch 210B and the voltage of the light-emitting unit 10A, the driving circuit 1A utilizes the voltage generating module 50A to generate the control voltage, so that the light-emitting unit 10A is driven to generate light, the operating switch 210A and the terminal switch 220 are respectively driven at the regulated state and at the turn_ON state. In the embodiment, the control voltage is 3.7 V, and the difference between the control voltage (3.7 V) and the activation voltage (0.7 V) of the operating switch (0.7 V) is larger than or equal to the preset voltage (3 V), so that the operating switch 210A is operated at the regulated state.

As shown in FIG. 3, the control unit 510 is coupled between the operating switch 210A and the operating switch 210B, and the voltages crossing the control unit 510 or the control unit 520 are 1 V, so that the control voltage received by the control end 203B of the operating switch 210B is 4.7 V. The difference between the control voltage (4.7 V) and the activation voltage (0.7 V) is larger than or equal to the preset voltage (3 V), so that the operating switch 210B is operated at the turn_ON state. In addition, the control voltage received by the control end 203C of the terminal switch 220 is 5.7 V. The difference between the control voltage (5.7 V) and the activation voltage (0.7 V) is larger than or equal to the preset voltage (3 V), so that the terminal switch 220 is operated at the turn_ON state.

It is noted that after the input voltage (32 V) passes through the light-emitting unit 10A and the operating switch 210A, the remaining of the input voltage is 0.5 V that is not enough to drive the light-emitting unit 10B to generate light, so that the current does not pass through the light-emitting unit 10B and the terminal switch 220. Similarly, the current does not pass through the light-emitting unit 10C and the terminal switch 220.

In other words, the operating switch 210A, the operating switch 210B, and the terminal switch 220 of the driving circuit 1A are operated at the regulated state by turns. That is, the driving circuit does not drive all of the switches to control the light-emitting units 10A~10C to generate light. In the embodiment, the driving circuit 1A only drives one switch to be activated to drive one or more light-emitting units to generate light so as to increase light-emitting efficiency at a unit period of the input voltage.

Figure 5:
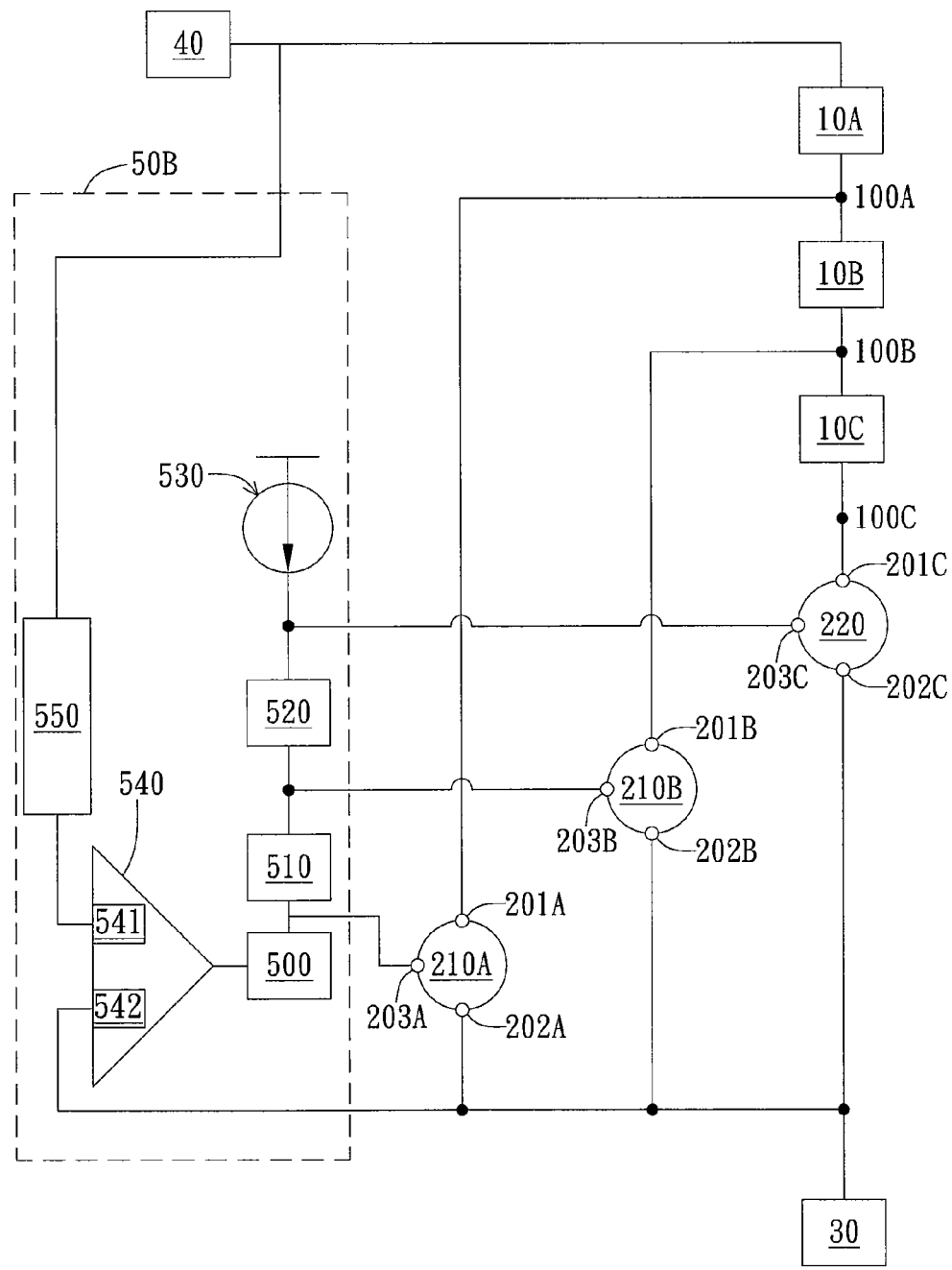
FIG. 5 is a schematic view of another embodiment of the driving circuit of the present invention.

Please refer to FIG. 5; FIG. 5 is a schematic view of an embodiment of a driving circuit 1B of the present invention. As shown in FIG. 5, compared to the driving circuit 1A, the voltage generating module 50 of the driving circuit 1B further includes a voltage divider 550, wherein the voltage divider 550 is coupled between the positive input end 541 and the power supply rectifier 40. In practical applications, the voltage divider 550 receives the input voltage of the power supply rectifier 40 to generate a setting voltage to the positive input end 541, and the adjusting unit 540 controls the operating bias voltage according to the setting voltage. In the embodiment, the voltage divider 550 utilizes one or more resistors (not shown) and is connected in parallel with the power supply rectifier 40, the positive end 541 of the adjusting unit 540, and a zero-level to generate a partial voltage.

It is noted that the voltage divider 550 generates the setting voltage according to the input voltage, so that the setting voltage becomes the full-wave rectification voltage and has full-wave rectification waveform of the input voltage. In addition, the voltage divider 550 transmits the setting voltage to the positive input end 541 of the adjusting unit 540, and the current setting module 30 connects the negative input end 542 of the adjusting unit 540. Furthermore, the adjusting unit 540 controls the operating bias voltage according to the setting voltage, so that the operating bias voltage becomes the full-wave rectification voltage and has full-wave rectification waveform.

Figure 6:
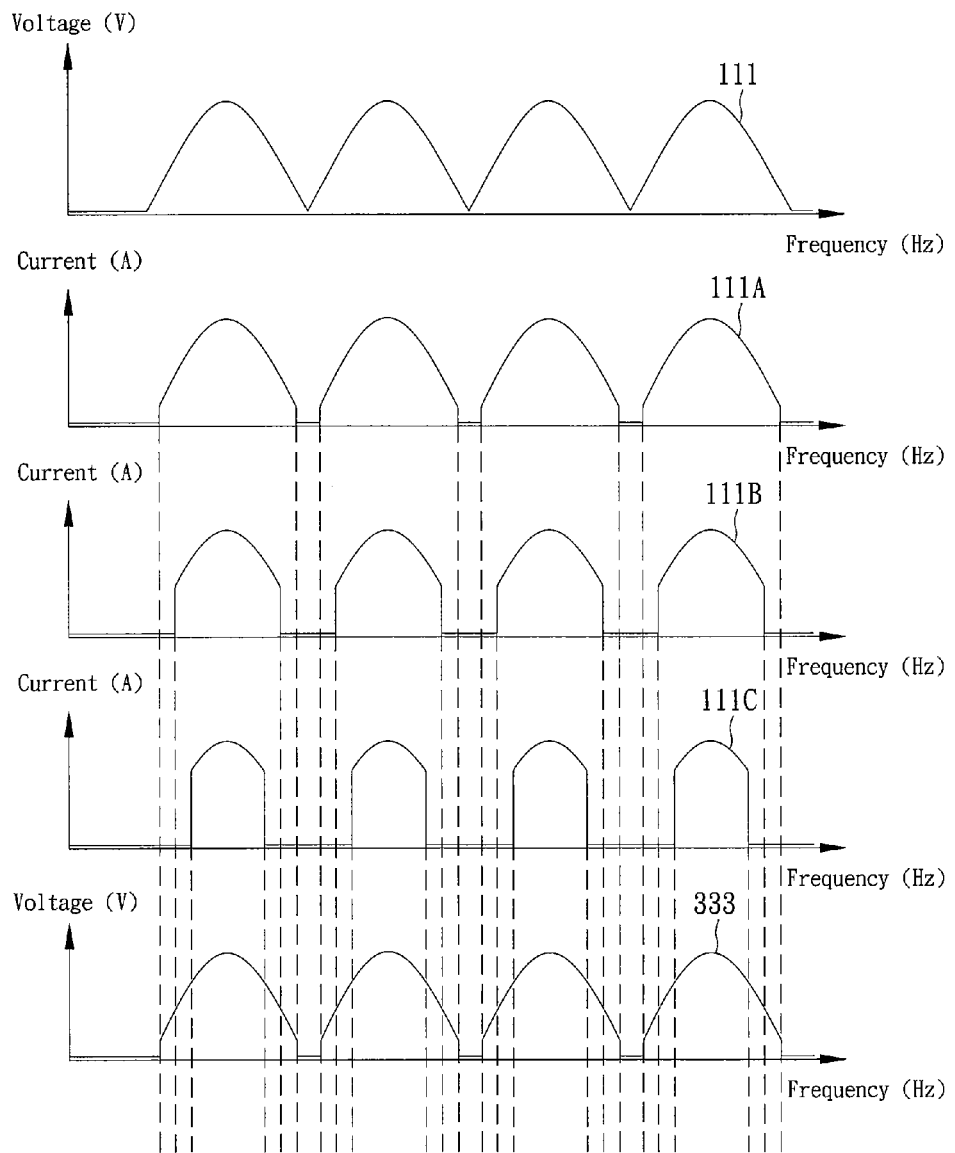
FIG. 6 is a schematic view showing the relation between the current curve of the input voltage, the current curve of the light-emitting unit, and the voltage curve of the current setting module of the present invention.

Please refer to FIG. 6; FIG. 6 is a schematic view showing the relation between the current curve of the input voltage, the current curve of the light-emitting unit, and the voltage curve of the current setting module of the present invention. As shown in FIG. 6, the voltage curve 333 of the current setting module 30 has the full-wave rectification waveform of the input voltage curve 111 of the input voltage curve 111 and does not have the square-wave voltage waveform of FIG. 6. In practical applications, the driving circuit 1B utilizes the operating bias voltage to control the currents of the light-emitting units 10A~10C so as to increase light-emitting stability.

It is noted that the current curve 111A of the light-emitting unit 10A, the current curve 111B of the light-emitting unit 10B, and the current curve 111C of the light-emitting unit 10C are driven according to the voltage curve 333 of the current setting module 30. In other words, the current curves of the light-emitting units have the full-wave rectification waveform of the current curve of the input voltage, so that the driving circuit 1B can increase the power factor. In addition, the driving process of the voltage generating module 50B controlling the operating switch 210A, the operating switch 210B, and the terminal switch 220 is the same as the driving process of the driving circuit 1A and not elaborated hereinafter.

Figure 7:
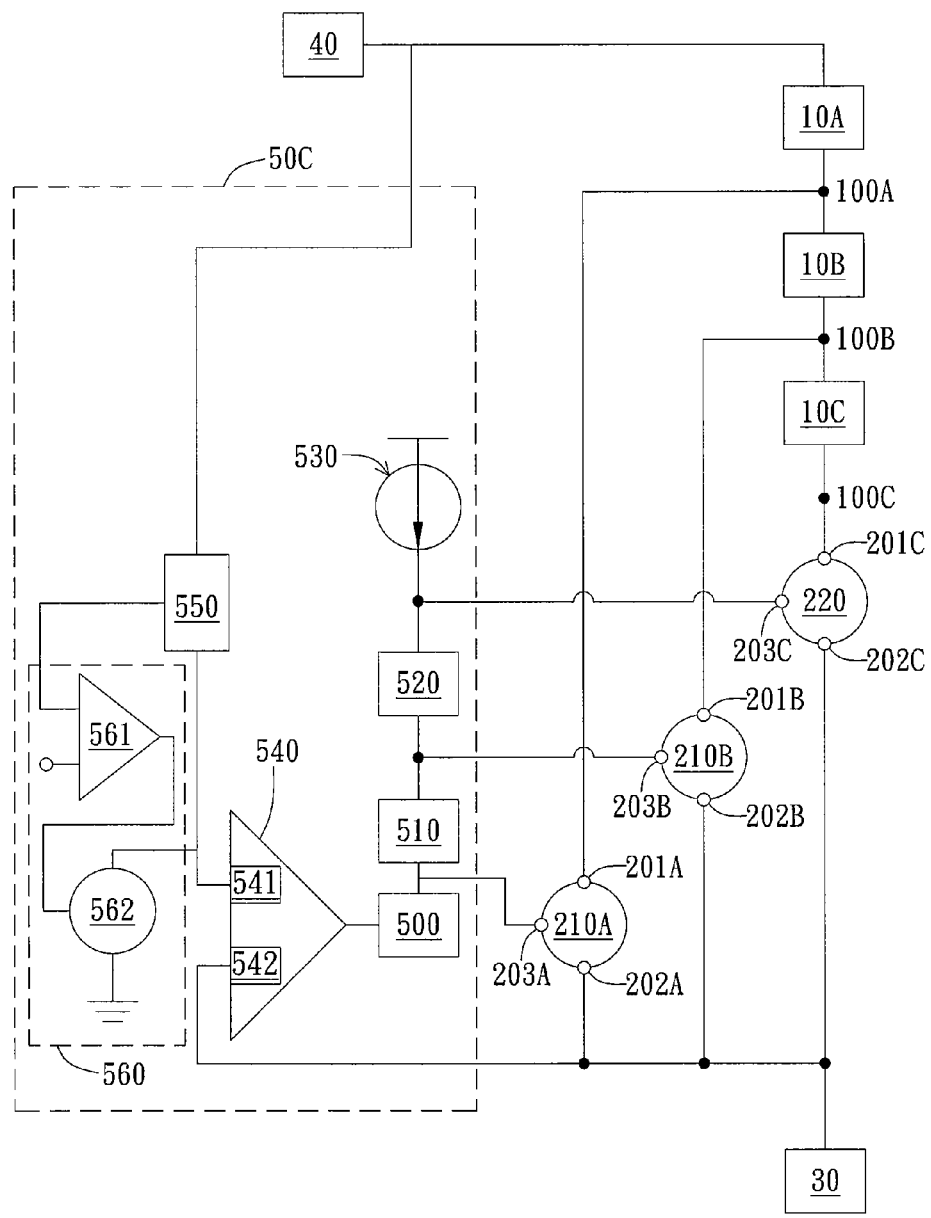
FIG. 7 is a schematic view of another embodiment of the driving circuit of the present invention.

Please refer to FIG. 7; FIG. 7 is a schematic view of another embodiment of the driving circuit of the present invention. As shown in FIG. 7, compared to the driving circuit 1B of the FIG. 5, the voltage generating module 50C of the driving circuit 1C further includes a current clamping unit 560, wherein the current clamping unit 560 is coupled between the voltage divider 550 and the positive input end 541 of the adjusting unit 540. In practical applications, the current clamping unit 560 has a comparator 61 and a clamping switch 562, wherein the positive input end of the comparator 561 is coupled with the voltage divider 550, and the negative input end of the comparator 561 has a clamping voltage. In addition, the output end of the comparator 561 is coupled with the clamping switch 560 to control the comparator 561 to output the clamping voltage.

Figure 8:
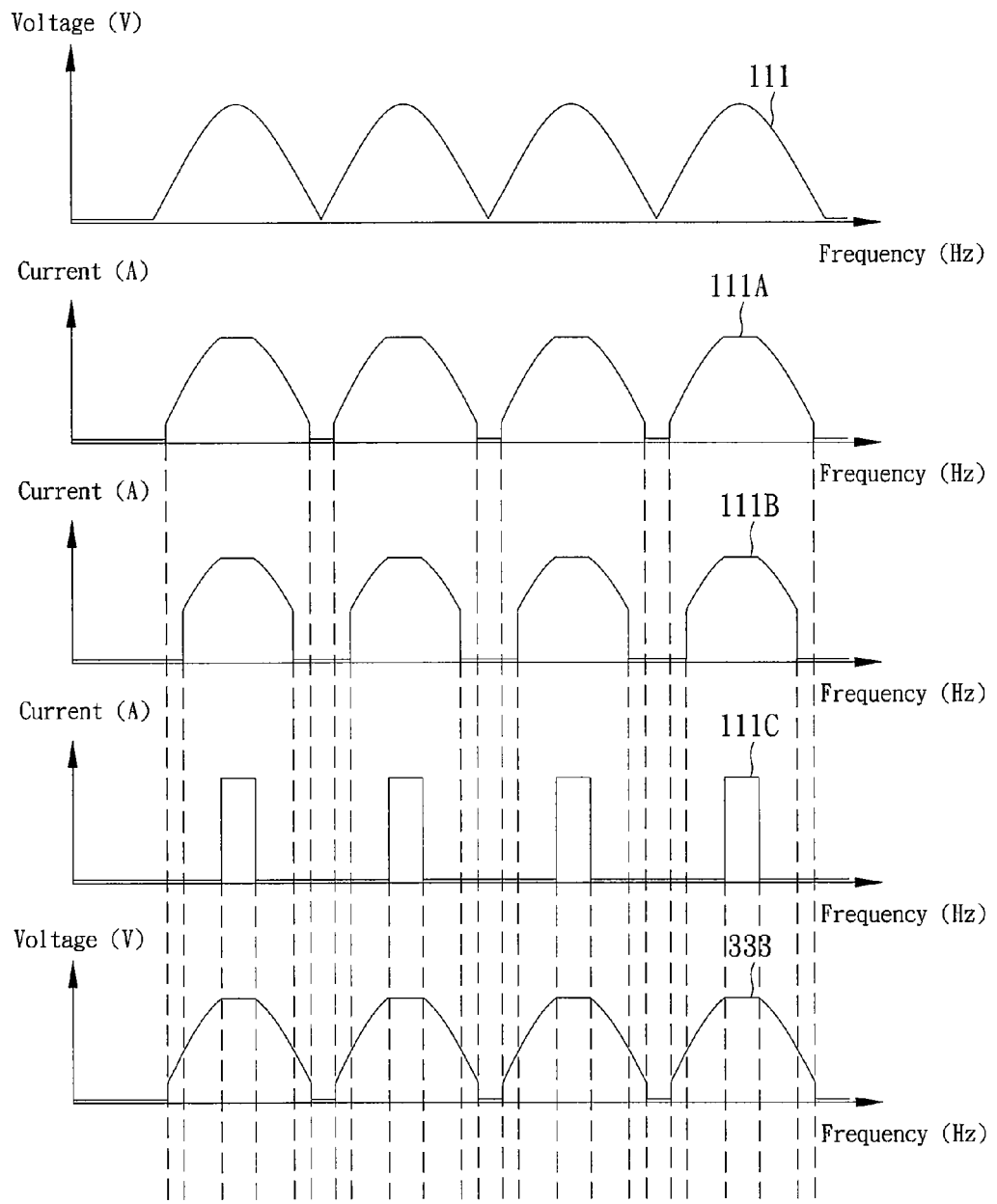
FIG. 8 is a schematic view showing the relation between the current curve of the input voltage, the current curve of the light-emitting unit, and the voltage curve of the current setting module of the present invention.

It is noted that the current clamping unit 560 utilizes the clamping voltage to control the upper-limit of the operating bias voltage so as to avoid overly high current to affect the circuit. Please refer to FIG. 8; FIG. 8 is a schematic view showing the relation between the current curve of the input voltage, the current curve of the light-emitting unit, and the voltage curve of the current setting module of the present invention. As shown in FIG. 8, the upper-limit of the voltage curve 333 of the current setting module 30 is less than or equal to the clamping voltage V1, and the current curve 111A of the light-emitting unit 10A, the current curve 111B of the light-emitting unit 10B, and the current curve 111C of the light-emitting unit 10C are driven according to the voltage curve 333 of the current setting module 30 so as to avoid the light-emitting units having overly high current. In other words, the driving circuit 1C can decrease the waste of power and increase the power factor as well as the light-emitting stability.

Figure 9:
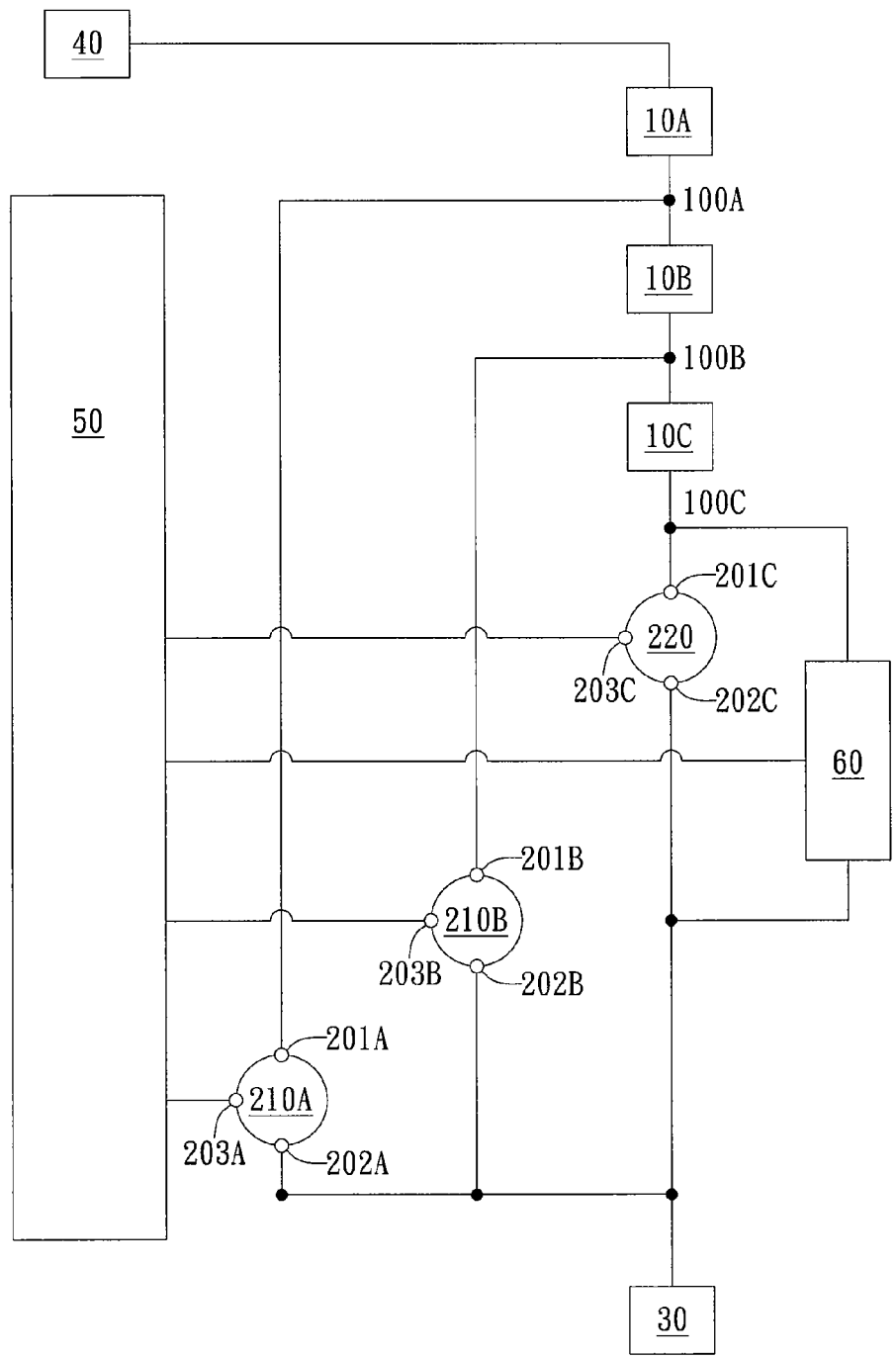
FIG. 9 is a schematic view of another embodiment of the driving circuit of the present invention.

Please refer to FIG. 9; FIG. 9 is a schematic view of another embodiment of the driving circuit of the present invention. As shown in FIG. 9, the driving circuit 1D further includes at least one heat sink module 60 coupled with at least one of the switches. In the embodiment, the heat sink module 60 is coupled with the terminal switch 220 in parallel, wherein the input voltage generates a current, and the current flows through the heat sink module 60, so that the heat sink module 60 generates power to avoid the overly high current passing through the terminal switch 220.

In particular, the heat sink module 60 includes a resistor component (not shown) and a heat sink switch (not shown), wherein the heat sink switch is further connected to a control unit (not shown) of the voltage generating module 50; the coupling structure can be the same as the other switches, but not limited to the embodiment. It is noted that the voltage generating module 50 provides the control voltage to the operating switches 210A/210B, the terminal switch 220, and the heat sink switch, wherein the control voltage of the heat sink switch I is larger than or equal to the control voltage of the terminal switch 220, so that more current passes through the heat sink module 60, and less current passes through the terminal switch 220. In other words, the heat sink module 60 can decrease the current loading of the terminal switch 220 and can increase the usage rate of the terminal switch 220 so as to improve the efficiency of heat dissipation. In addition, the heat sink module 60 can adjust the resistance of the resistor component to control mostly of the current passing through the heat sink module 60, so that the terminal switch 220 is operated at the regulated state so as to decrease the waste of the power on the terminal switch 220.

In comparison with prior arts, the driving circuit of the present invention utilizes the voltage generating module to adjust the voltages and provide the control voltages to the switches so as to control the switches to be activated or to be deactivated. In practical applications, the driving circuit utilizes the voltage generating module to control the operating bias voltage to determine the driven state of the light-emitting units. In addition, no matter how many light-emitting units are driven to be activated, the driving circuit does not need to drive all of the switches to be activated at the same time so as to drive all of the light-emitting units to generate light. In an embodiment, the voltage utilized by the light-emitting units and the input voltage are full-wave rectification voltages, so that only a small amount of input voltage is wasted, further enhancing the power factor.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

The invention claimed is:
1. A driving circuit, comprising:
a plurality of light-emitting units, wherein the light-emitting units are coupled with each other in series and are driven with an input voltage varying according to a frequency;
a plurality of switches, wherein each switch has a preset voltage and an activation voltage and comprises a light-emitting end, a control end, and a setting end, the light-emitting ends are coupled with the light-emitting units, and the setting ends of the switches are coupled with each other;
a voltage generating module coupled with the control ends of the switches and comprising a plurality of control units, wherein each control unit is respectively coupled between the adjacent control ends; the voltage generating module provides a plurality of control voltages to the switches, and each switch is driven to be activated or to be deactivated according to a relation of the preset voltage and a difference between the control voltage and the activation voltage when the input voltage drives the light-emitting units, the switches, and the control units; and
a current setting module coupled between the setting ends of the switches and the voltage generating module, wherein the voltage generating module provides an operating bias voltage to the current setting module, and the voltage generating module controls the operating bias voltage to determine a light-emitting voltage of each light-emitting unit and the control voltages of the switches;
wherein the voltage generating module includes an adjusting unit having a positive input end and a negative input end, wherein the negative input end is coupled with the current setting module.

2. The driving circuit of claim 1, wherein the voltage generating module further comprises:
a voltage divider coupled with the positive input end, wherein the voltage divider receives the input voltage to generate a setting voltage to the positive input end, and the adjusting unit controls the operating bias voltage according to setting voltage.

3. The driving circuit of claim 1, wherein the positive input end receives a reference voltage, and the adjusting unit controls the operating bias voltage according to reference voltage, so that the operating bias voltage is less than or equal to the reference voltage.

4. The driving circuit of claim 1, wherein a corresponding one of the switch is driven to be activated when the control voltage thereof is larger than the preset voltage and the difference between the control voltage and the activation voltage is larger than or equal to the preset voltage.

5. The driving circuit of claim 1, wherein the switches comprise:
a plurality of operating switches, wherein the light-emitting ends of the operating switches are respectively coupled with a plurality of coupling nodes of the light-emitting units; and
a terminal switch, wherein the light-emitting end of the terminal switch is coupled with a terminal end of the light-emitting units.

6. The driving circuit of claim 5, wherein the control voltage of the terminal switch is larger than or equal to the control voltages of the operating switches.

7. The driving circuit of claim 1, further comprising:
a power supply rectifier coupled with the light-emitting units and providing the input voltage, wherein the input voltage is a full-wave rectification voltage.

8. The driving circuit of claim 1, further comprising:
at least one heat sink module coupled with at least one of the switches, wherein the input voltage generates a current, the current flows through the at least one heat sink module, so that the at least one heat sink module generates power.

* * * * *